April 15, 1930. E. ROGERS 1,754,803
SHIPPING BRACKET FOR MOTOR VEHICLES OR THE LIKE
Filed March 18, 1918
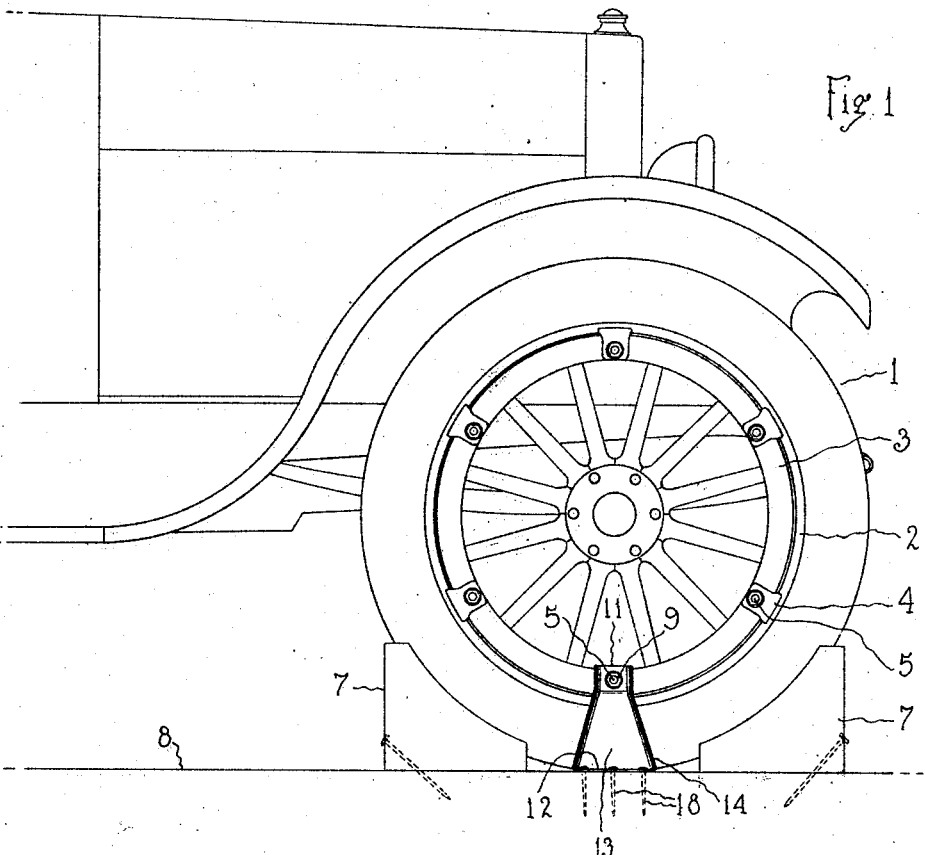
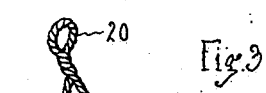
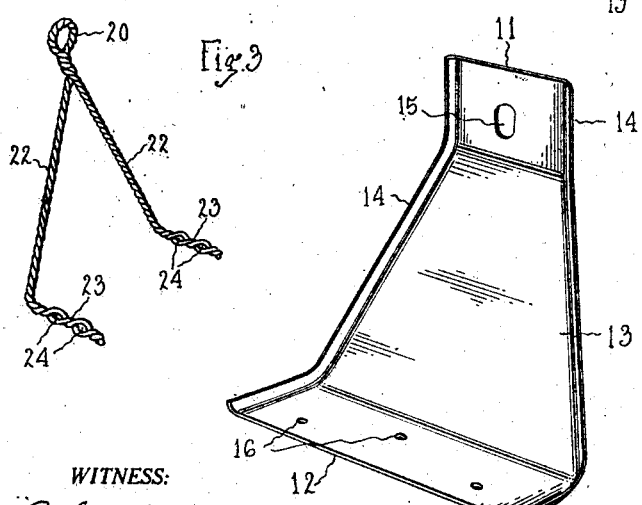
WITNESS:
Arthur F. Draper
INVENTOR.
Edbert Rogers
BY
Loyd Blackmore
ATTORNEY.

Patented Apr. 15, 1930

1,754,803

UNITED STATES PATENT OFFICE

EDBERT ROGERS, OF FLINT, MICHIGAN, ASSIGNOR TO E. S. EVANS & COMPANY, OF DETROIT, MICHIGAN, A CORPORATION OF MICHIGAN

SHIPPING BRACKET FOR MOTOR VEHICLES OR THE LIKE

Application filed March 18, 1918. Serial No. 223,045.

The present invention relates to the shipping of assembled motor vehicles, its object being to provide an inexpensive device for firmly holding the wheels on the chocks and for avoiding the defacing incident to the use of the holding means ordinarily employed.

For this purpose, it consists in a holding element or connecting link adapted to cooperate with one of the rim-holding bolts to secure the wheel firmly in place. More specifically, it consists in an element of the nature stated so constructed and arranged as to transmit the stresses from the bolt into the floor at points some distance apart longitudinally of the vehicle and some distance laterally from the wheel, whereby a compound bracing action is secured and whereby clearance is provided for the tire. It further consists in a bracing member which may be readily removed from the rim-bolt without stripping the threads thereon. It also consists in the details of construction shown, described and claimed.

In the drawings, Fig. 1 is a side view of the front end of an automobile showing a preferred embodiment of the invention. Fig. 2 is a perspective view of the plate which appears in Fig. 1. Fig. 3 is a perspective showing a modification.

The numeral 1 indicates the front wheel of an automobile, 2, the rim, 3, the felly, 4, the clips, and 5 the usual bolts for holding the rim in place on the wheel structure. In shipping the assembled vehicle, the tire 6 is received in grooved, wooden chocks 7 nailed to the floor 8 of the freight car or other carrying vehicle. The chocks alone are insufficient to reliably hold the wheels, and it is therefore customary to use straps or the equivalent which are passed around the rim and felly and have their ends nailed to the floor. These straps tend to deface the wheels and are both expensive and not easy to apply uniformly. According to the present invention, one of the bolts 5 and the corresponding nut 9 are utilized to firmly hold the wheel in place on the chocks.

Various devices may be employed as the connecting link between the bolt and the floor, the pressed metal plate shown in Figs. 1 and 2 being preferred. This plate consists in a substantially vertical portion 11 which conforms to the face of the felly 3, a horizontal portion 12 of considerably greater length, measured longitudinally of the automobile, than the portion 11 and a fan-shaped or tapering connecting portion 13. For stiffening purposes and to do away with edge portions which might tend to deface the wheel, the margins of the plate are preferably curved outwardly, as indicated at 14. The portion 11 is provided with a central vertically elongated perforation 15 of greater length than the diameter of the bolts 5, and the horizontal portion 12 has a series of small holes 16. In use, the wheel is turned so that one of the bolts is approximately in the central transverse vertical plane thereof, the nut 9 is removed and the plate is slipped on with the bolt passing through the perforation 15. The length of the perforation relative to the diameter of the bolt allows for the variations in the diameter and inflation of the tires and for slight differences in the floor level, the adjustment of the chocks, and so on. When the nails 18 are driven through the holes 16 and the nut 9 is screwed up tight, the wheel is firmly held in position in such manner that substantially no relative movement takes place between the wheel and the plate, thus avoiding defacing the finish of the wheel. It is evident, also, that when the automobile is to be unloaded the plate 11—12—13 may be easily bent out from the bolt 9 without stripping the threads thereon to enable the workman to thereafter more easily detach the plate by pulling the nails 18.

As a modification, the holding link may be made of twisted wire as shown in Fig. 3. The mid-portion of this wire forms a closed loop 20 which is adapted to pass around the bolt 5 under the nut 9. The wire extends from the loop in branches 22 which diverge from each other longitudinally of the vehicle and which also lie in an inclined plane corresponding to the plane of the part 12 of the plate heretofore described; and the branches terminate in substantially horizontal portions 23 between the strands of which nails may be driven at 24 into the floor of the car.

It is evident that various other modifications may be readily devised embodying the invention, and I do not, therefore, wish to be limited except as indicated by the subjoined claims.

I claim:—

1. Means for holding a vehicle in fixed position on a floor, said means comprising a brace arranged to be received under a nut of a bolt of one of the wheels of the vehicle and to extend laterally and downwardly therefrom, and two chocks secured to the floor aforesaid and located one upon each side of said brace, and which chocks are in engagement with the tire of the vehicle wheel.

2. In combination with a vehicle wheel including a laterally projecting bolt adjacent the periphery thereof, a brace fitting over said bolt and extending laterally and downwardly therefrom, said brace being adapted to be nailed to the floor of a freight car or other transporting device for the vehicle, and two chocks secured to the floor aforesaid and located one upon each side of said brace, and which chocks are in engagement with the periphery of the vehicle wheel.

3. Means for holding a vehicle in fixed position on a floor, said means comprising a brace arranged to be received under the nut of a bolt of one of the wheels of the vehicle and to extend laterally and downwardly therefrom to the floor, the brace having an opening therein of greater dimension than the diameter of the bolt, whereby the brace may be tilted outwardly about its lower end without stripping the threads from the bolt; and two holding members disposed one upon each side of said brace and engaging the tire of the vehicle wheel to thereby prevent movement thereof upon said floor.

4. A wheel brace formed from a single sheet of pressed metal and comprising an upper substantially vertical portion, perforated to receive a wheel bolt, a lower substantially horizontal portion perforated to receive nails whereby the brace may be secured to a floor, said horizontal portion being of greater width than the vertical portion, and an inclined flaring connecting portion.

5. A sheet metal wheel brace comprising a substantially horizontal portion perforated to receive nails for holding the brace to a floor, an inclined intermediate portion, and a substantially vertical upper portion perforated to receive a rim bolt and adapted to conform to the outer face of the felly of a wheel, said vertical portion having its side edges turned outwardly on the side corresponding to the inclined portion whereby defacing of the felly is avoided.

6. A pressed sheet metal wheel brace having a substantially horizontal portion perforated to receive nails and a substantially vertical portion of less width than that of the horizontal portion and perforated to receive a bolt on the wheel, and a flaring outwardly inclined connecting portion having its side edges turned outwardly away from the plane of the vertical portion.

7. In mechanism for securing a vehicle to a car for shipment, said vehicle including a wheel, the combination of a bolt carried by said wheel, a brace member secured to said bolt, and means for securing said brace member to said car.

8. In combination with a vehicle including wheels provided with rim bolts, a brace member co-operating with one of said bolts to prevent said wheel from turning, whereby said vehicle is secured in position for shipment.

9. In a device of the class described and in combination with a vehicle having wheels thereon, rim bolts on said wheels, a support for said vehicle, and means for fixedly securing the wheels of said vehicle relatively to said support, the means for each wheel including a chock fixed relatively to said support and engaging the periphery of said wheel, and means engaging one of said rim bolts and said support for preventing the turning of said wheel.

10. In combination with a vehicle provided with wheels, a support therefor, a brace member engaging a portion of one of said wheels for holding said wheel on said support, said brace member extending downwardly and laterally outwardly from said vehicle into engagement with said support and having each of its ends located outwardly of said wheel from said vehicle and means for engaging and positively securing each end of said brace member in position for holding said wheel in engagement with said support, substantially as shown and described.

11. A metal wheel tie for securing a pneumatic tired wheel comprising a foot portion adapted to be secured to a floor, a portion constructed to be secured to the wheel and an intermediate portion adjacent the tire of the wheel having its edges turned outwardly away from said tire.

12. A metal tie for securing a pneumatic tired wheel to a floor comprising a foot portion adapted to be secured to the floor, a portion constructed to be clamped against the side of the felly of said wheel and an intermediate portion having its edges bent to present rounded surfaces opposite the tire of said wheel.

13. An integral sheet metal wheel tie for securing a pneumatic tired wheel to a floor comprising a foot portion adapted to be secured to the floor, a portion adapted to engage the rim of a wheel and and an intermediate portion having means at its edges to prevent cutting of the tire.

14. In combination, a vehicle mounted upon wheels, said wheels having demountable rims, bolts securing said rims to said wheels, and braces attached to said bolts and extending to a stationary object for preventing endwise movement of the vehicle.

15. In combination with a vehicle provided with wheels, a floor support for supporting said wheels, a light metallic brace member engaging a portion of one of said wheels for holding said wheel on said support, said brace member extending downwardly from said vehicle into engagement with said support and having each of its ends located outwardly of said wheel from said vehicle, and means for engaging and positively securing each end of said brace member in position for holding said wheel in engagement with said support for supporting said vehicle.

In testimony whereof I affix my signature.

EDBERT ROGERS.